Patented Feb. 5, 1946

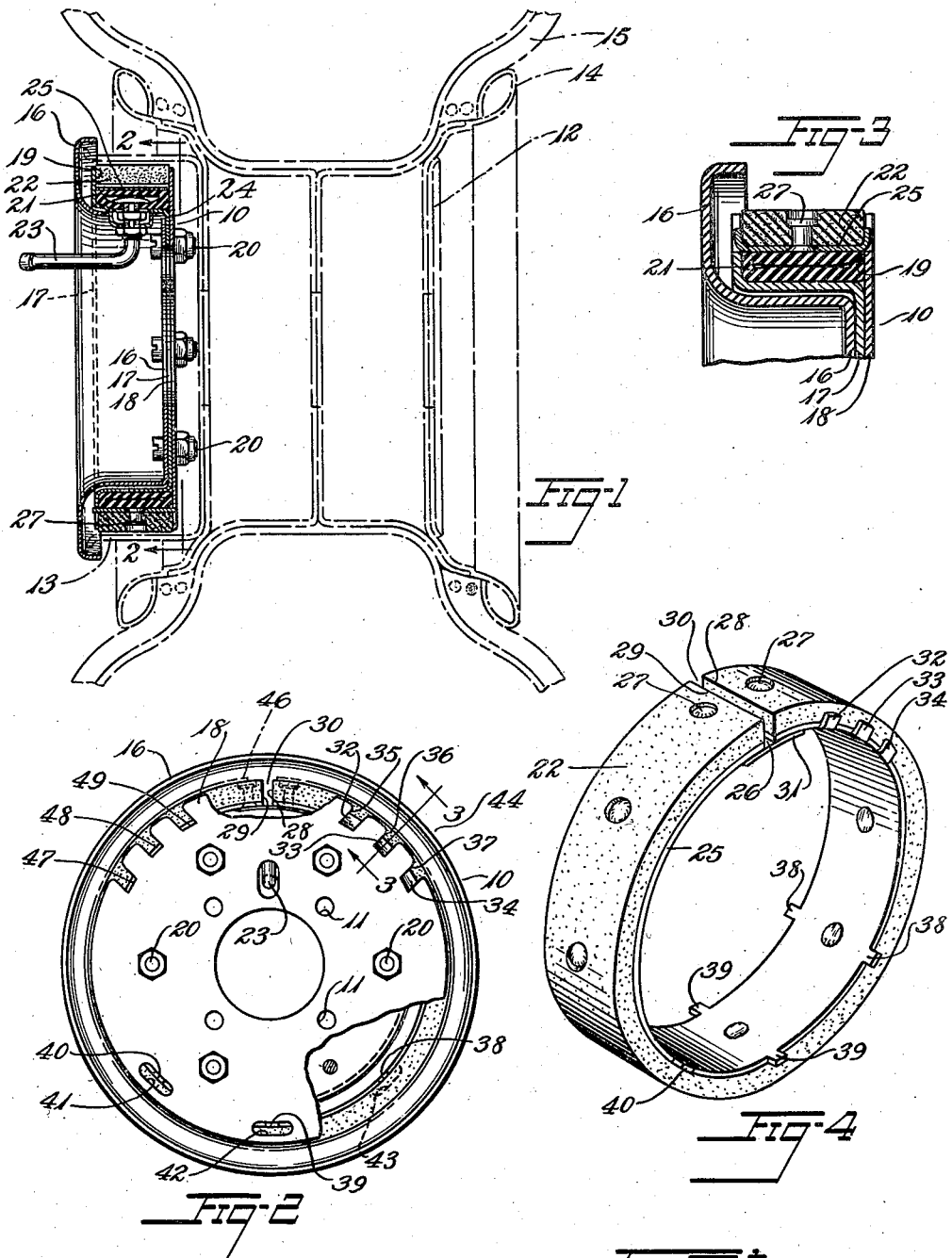

2,394,311

UNITED STATES PATENT OFFICE 2,394,311

FRICTIONAL MECHANISM

Russell J. Keller, Akron, Ohio, assignor to The B. F. Goodrich Company, New York, N. Y., a corporation of New York Application August 25, 1943, Serial No. 499,962

5 Claims. (Cl. 188—152)

This invention relates to frictional mechanisms for rotatable bodies, such as brakes for the wheels of aircraft, or other vehicles, and pertains especially to brakes operated by fluid pressure. Features of the invention are applicable also in clutches and other power-transmission devices.

The principal objects of the invention are to provide dependable application of power, to provide simplicity of construction, to provide simplicity of operation, to provide positive quick-action, and uniform action around the periphery, to provide self-conforming action of the friction surface, to provide longevity of the mechanism, to provide for economy in manufacture, and to provide simplicity and facility of manufacture and assembly.

These and further objects will become apparent from the following description, reference being had to the accompanying drawing in which:

Fig. 1 shows a brake assembly constructed in accordance with and embodying the invention, a vertical section of the brake assembly being shown in full lines and associated wheel parts in broken lines.

Fig. 2 is a side view of the brake assembly, taken along the line 2—2 of Fig. 1, parts being broken away to show the brake structure.

Fig. 3 is a fragmentary and enlarged section of the brake taken along the line 3—3 of Fig. 2.

Fig. 4 is a perspective view of the assembled brake band and retractor spring.

Referring to the embodiment of the invention shown in the drawing, the torque flange of a torque frame 10 may be fastened by bolts extending through holes 11 to a flange of a shaft (not shown). The torque flange is located adjacent to a wheel 12 and is mounted for relative rotative movement with respect to it of a brake drum 13 fixed on the wheel. The wheel may have a rim 14 to seat a pneumatic tire 15.

The torque frame, which may be made of plates 16, 17, and 18, is formed with a circumferential channel 19, underlying the brake drum 13, defined by plate 17 at one side and plate 18 at the other, held together in the flange region by bolts 20. An annular expander tube 21 is seated in this circumferential channel 19, with its inner face in continuous contact therewith to force a braking band 22 against the brake drum 13 when the tube is inflated. The expander tube is connected by an L-shaped metal stem 23 extending through a dust guard 16, and the removable flange plate 17 to a source of fluid pressure.

The annular channel 19 is formed by bolting together plates 17 and 18, and the guard plate 16 may be bolted with them as shown. This channel 19 preferably is formed with a localized depression 24 at the position of the connection 23 so that the tube walls will remain spaced apart at this position to facilitate initial entry of the braking fluid and to facilitate drainage thereof.

Mounted in the channel 19 and adjacent to the expander tube 21 is a circumferential ring 25 of spring steel severed transversely as at 26, and provided with torque lugs 32, 33 and 34 integral with the ring and fastened as by rivets 27 to a brake band 22 preferably formed of molded heat-resistant friction composition. The ring 25 and the band 22 substantially enclose the expander tube 21 except where the leading end 28 adjoins the trailing end 29 where they may be slightly open as at 30. This opening provides for the contraction of the brake bands and spring. A thin sheet of metal 31 may be inserted between the expander tube 21 and the spring 25 to shield the tube from heat radiation from the drum 13.

Torque lugs 32, 33 and 34, which extend from the margins of the spring 25, extend sufficiently out from the body of the spring to engage similarly shaped slots 35, 36, and 37, extending radially in the torque flange 10. Such lugs are shaped so that they can anchor the band 22 with its spring 25 against circumferential movement but at the same time permit radial movement of the spring and band assembly when the expander tube 19 applies pressure on the inner face of the spring 25. Such movement prevents slippage of the band and spring assembly in the channel 19, and at the same time permits radial expansion of the assembly to contact the brake band with the rotating brake drum 13.

Additional torque lugs 38, 39 and 40 are positioned circumferentially remote along the margins of the spring 25, to extend through circumferentially-flattened, ovate holes 41, 42 and 43 in the torque flange 10, so that the circumferential and radial expansion of the spring 25 is limited in all directions.

The action of the brake as described below with reference to the brake assembly as seen in Fig. 2 involves a clockwise motion of the braking drum with respect to this assembly.

It has been found that by securely anchoring the leading end 28 of the brake assembly by the torque lugs 32, 33, and 34 in the region 44 to permit little or no circumferential movement of the assembly in this region as the expander tube inflates and forces the brake band 22 to engage the brake drum, that the remainder of the brake band and spring assembly trailing this leading portion under expansion of the tube tends to unwrap by circumferential straightening and radial extension, such action being accompanied by an angular displacement of the trailing end of the band in a direction opposite to that of the rotating brake drum, as shown by the broken line position in Fig. 2. By virtue of this tendency to unwrap as the brake lining contacts the braking surface of the brake drum 13 it promotes uniform circumferential contact with the brake drum 13 as the expander tube 21 inflates and moves the braking surface by uniform radial expansion toward the brake drum 13, and the diameter of the brake assembly gradually increases thus causing the trailing end 29 of the brake assembly to move into the position 46 as it retards or stops the rotative movement of the drum.

When the pressure is released from the expander tube 21, the retractor spring 25 with the attached brake band 22 releases the assembly from the brake drum 13 to move back to the channel 19 prior to another application of pressure on the brake assembly by the expander tube 21.

Additional torque slots 47, 48, and 49 are provided in the flange plates 17 and 18 to engage torque lugs axially opposite the lugs 32, 33 and 34 when the parts are reversed and the brake is used for a left-hand wheel assembly.

The circumferential ovate holes 41, 42, and 43 are symmetrical with respect to lugs axially opposite the lugs 38, 39, and 40 so that either set of these lugs will fit into the holes 41, 42, and 43 in either a right-hand or left-hand wheel assembly.

Variations may be made without departing from the scope of the invention as it is defined by the following claims.

I claim:

1. A brake structure comprising a torque frame having slots and adapted to be associated with a brake drum, a brake band and associated retractor spring fastened thereto, said retractor spring having circumferentially spaced-apart torque lugs extending from its edges to ride in said slots in said torque frame, and an associated expander tube to effect the engagement of said brake band with said drum.

2. A brake structure comprising a torque frame having slots, a brake drum opposed to the same and rotatable with relation thereto, an expander tube supported by the torque frame, a brake band and fastened thereto a circumferential retractor spring having marginal torque lugs, the spring and band assembly being locked against rotation by said torque lugs extending from the margins of said spring into said slots in said torque frame.

3. A frictionally engageable structure comprising suporting means, an expansible tube supported by said means, a friction member and a retraction spring member disposed at the back face of said friction member and having torque lugs circumferentially spaced and extending from its edge to engage said supporting means.

4. A brake structure comprising a torque frame, a brake drum surrounding the same and rotatably mounted with respect thereto, a cooperating brake member to engage said brake drum, a retractor spring ring provided with torque lugs and fastened to said brake member, and an inflatable tube under said ring to effect such engagement, said brake member and said retractor spring being divided to form a leading end and a trailing end of said band and spring assembly, said leading end being circumferentially anchored by engagement of torque lugs of the ring with slots in said frame and additional torque lugs extending from the edges of said retractor spring and riding in circumferential ovate slots provided in said torque frame and permitting radial and circumferential movement of said trailing end of the band and spring assembly.

5. A brake structure comprising a torque frame adapted to be associated with a brake drum, a brake band and an associated annular retractor spring fastened thereto, said retractor spring at its lateral margins and said torque frame having circumferentially spaced-apart cooperating anchoring means, and an associated expander tube to effect the engagement of said brake band with said drum.

RUSSELL J. KELLER.